(12) United States Patent
Olson (10) Patent No.: US 6,438,625 B1
(45) Date of Patent: Aug. 20, 2002

(54) SYSTEM AND METHOD FOR AUTOMATICALLY IDENTIFYING SLOTS IN A BACKPLANE

(75) Inventor: Philip D. Olson, Kenwood, CA (US)

(73) Assignee: Centigram Communications Corporation, San Jose, CA (US)

( * ) Notice: Subject to any disclaimer, the term of this patent is extended or adjusted under 35 U.S.C. 154(b) by 0 days.

(21) Appl. No.: 09/425,847

(22) Filed: Oct. 21, 1999

(51) Int. Cl.[7] .......................... H01R 12/14; G06F 13/00
(52) U.S. Cl. ................... 710/9; 710/3; 710/8; 710/301; 710/300; 361/788
(58) Field of Search .............................. 710/2–4, 8, 9, 710/104, 300–392; 361/788

(56) References Cited

U.S. PATENT DOCUMENTS

| | | | | |
|---|---|---|---|---|
| 3,872,452 A | * | 3/1975 | Stoops ........................ 326/105 |
| 4,254,473 A | * | 3/1981 | Galdun et al. ................. 700/79 |
| 5,581,787 A | * | 12/1996 | Saeki et al. ...................... 710/9 |
| 5,745,708 A | * | 4/1998 | Weppler et al. .......... 340/825.5 |

* cited by examiner

Primary Examiner—Jeffrey Gaffin
Assistant Examiner—Ilwoo Park
(74) Attorney, Agent, or Firm—Pennie & Edmonds LLP (57) ABSTRACT

A computer controlled system has two or more secondary backplanes that are plugged into slots in a primary backplane. Board slots in the secondary backplanes are assigned unique addresses, and the range of addresses for each secondary backplane is contiguous with the range of addresses for a neighboring secondary backplane. Each slot in the primary backplane has one or more primary address pins. The primary address pins in the primary backplane slots are coupled so as to set the primary address pins in each primary backplane slot to a unique value. Each secondary backplane has a bus line for each primary address pin of the primary backplane slot into which it is plugged. The bus lines couple the primary address pins to board address identification pins, also called address pins, in certain of the board slots. Address pins are provided for each board slot, and are set to selected values for each board slot. Some of the address pins in each slot are set to a 0 or 1 binary value by connecting those pins to ground or leaving the pins to float to the pull-up voltage on the board. Others of the address pins in each slot are coupled to a respective one of the bus lines so as to set that address pin to a value that is determined by the primary backplane slot in which the secondary backplane is inserted.

8 Claims, 5 Drawing Sheets

SYSTEM AND METHOD FOR
AUTOMATICALLY IDENTIFYING SLOTS IN
A BACKPLANE

The present invention relates generally to digital systems, and particularly to providing contiguous addresses for boards which are plugged into a secondary backplane, which in turn is plugged into a primary backplane.

BACKGROUND OF THE INVENTION

Figure 1:
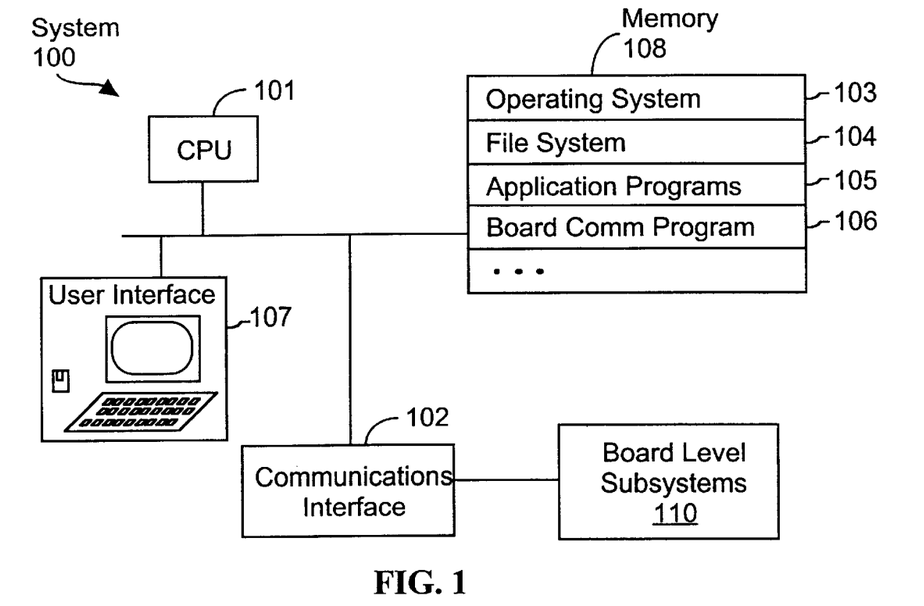
FIG. 1 is a block diagram of a computer controlled system, which might be composed in part of various boards plugged into a backplane.

The computer system 100 illustrated in FIG. 1 includes one or more CPU's 101, a communications interface 102, a user interface 107, and memory 108. A set of board level subsystems 110 are coupled to the main CPU 101 by the communications interface 102. The communications interface may include data, address and control busses on a backplane. The memory 108 includes an operating system 103, a file system 104, applications programs 105 and a board communications program 106 that handles communications with the board level subsystems 110.

Figure 2:
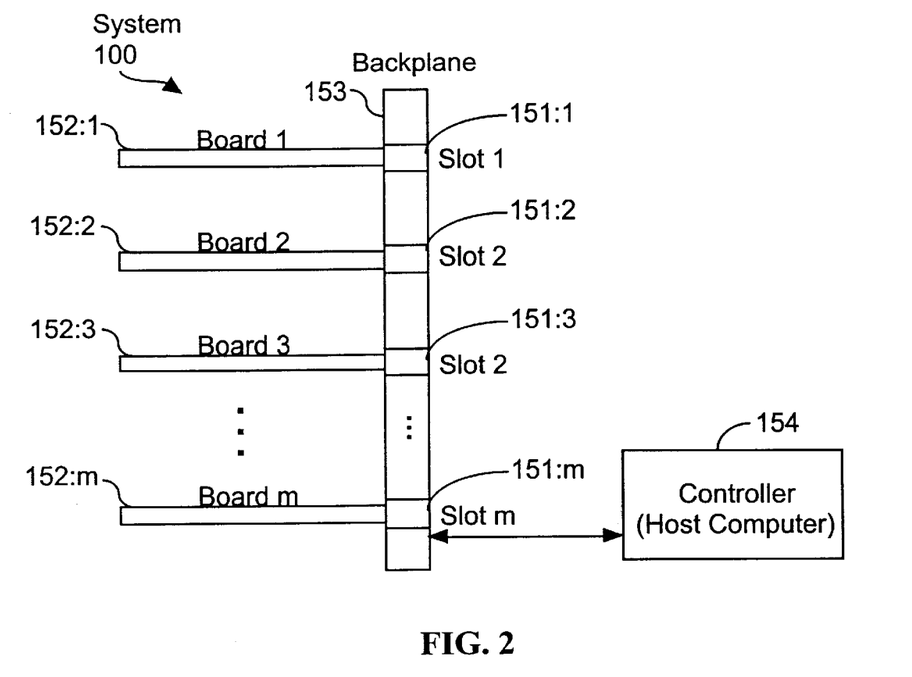
FIG. 2 illustrates a backplane with slots and boards plugged into the slots.

As shown in FIG. 2, the system 100 may be implemented as a set of boards 152 that are plugged into slots 151 on a backplane 153. A host controller 154 corresponds to the system components shown in FIG. 1, other than the board level subsystems 110. The host controller 154 may be implemented as one of the boards 152.

Each slot 151 has a unique binary identification or address that may be used to identify communications between the board 152 in a particular slot 151 and control devices such as a host computer 154. Each slot 151 of the backplane 153 has a number of address pins (not shown) and each board 152 has a corresponding number of board pins (not shown). The address pins and board pins are connected to each other when a board 152 is plugged into a slot 151 and are used to communicate the slot address to circuitry on the board. Each address pin of the slot 151, and the corresponding board pin on the board 152, is used to communicate one bit of the slot address. For example, a backplane with twenty slots will require five address pins for each slot. For convenience, the board pins on the boards and the address pins in the backplane slots are sometimes called "bits" because each pin carries a binary signal.

Typically, the pins on the boards have pull-up resistors and each of the address pins in each backplane slot is either connected to circuit ground, or left unconnected to "float" to the supply voltage. The pattern of grounded and unconnected address pins is read by circuitry on the board as a corresponding pattern of 0's and 1's, which together represent the slot address of the board. For example, slot 1 of a backplane might have the four most significant bits grounded and the least significant bit floating, representing a binary value of "1." A distinct pattern of grounded and unconnected address pins is used for each slot of the backplane so as to assign each slot a unique address. Preferably, the address pins in the slots are connected so as to assign addresses to the slots sequentially from a first value to a last value, such as from 1 to 20.

Figure 3:
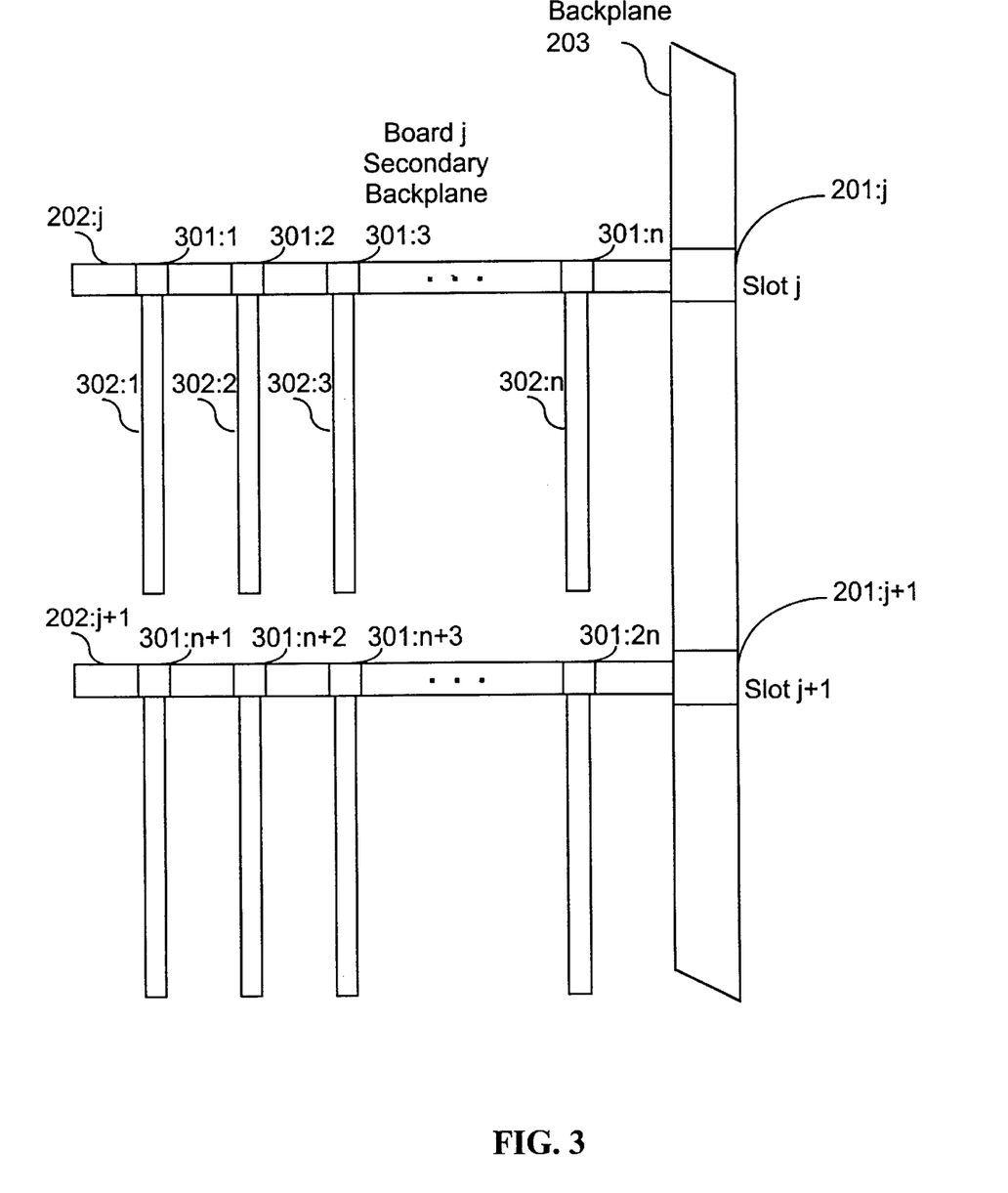
FIG. 3 illustrates part of a primary backplane with primary backplane slots, secondary backplanes and boards plugged into board slots of the secondary backplanes.

As illustrated in FIG. 3, some systems have two or more secondary backplanes 202 plugged into a primary backplane 203. Each secondary backplane has multiple board slots 301. Various boards 302 are plugged into the board slots (also called secondary backplane slots) 301 in the secondary backplanes 202. For example, if there are three slots 201 in the primary backplane for receiving secondary backplanes 202, and secondary backplanes 202 with ten slots each are plugged into the primary backplane 203, the primary backplane can accommodate a total of thirty boards, instead of three.

Each board slot 301 in each secondary backplanes 202 must be uniquely identified by a board address. Furthermore it is desirable for those board addresses to progress sequentially in accordance with the physical positions of the slots 301 within a secondary backplane, and for the address ranges of the boards in neighboring secondary backplanes 302 to be contiguous—for example, if a first secondary backplane has board addresses 1–10, the second secondary backplane preferably should have board addresses 11–20. It would also be desirable to be able to use identical secondary backplanes in each of the available slots of the primary backplane so that any secondary backplane can be plugged into any slot of the primary backplane. The present invention is a method and apparatus for generating a contiguous, sequential set of board addresses for boards that are plugged into the board slots of a plurality of secondary backplanes, where the secondary backplanes are plugged into slots in a primary backplane.

It would also be desirable for each of the circuit boards 302 to be usable in any of the board slots 301 of the system, and thus for all of the circuit boards 302 to have identical address reading circuitry.

SUMMARY OF THE INVENTION

In summary, the present invention is an apparatus and method for providing addresses for boards plugged into slots in secondary backplanes, referred to as board slots. The secondary backplanes are in turn plugged into slots in a primary backplane, referred to as primary backplane slots. The addresses are unique for each board slot, and the range of addresses for each secondary backplane is contiguous with the range of addresses for a neighboring secondary backplane. The addresses are set as follows. Each slot in the primary backplane has one or more primary address pins. The primary address pins in the primary backplane slots are coupled so as to set the primary address pins in each primary backplane slot to a unique value. Each secondary backplane has a bus line for each primary address pin of the primary backplane slot into which it is plugged. The bus lines couple the primary address pins to board address identification pins, also called address pins, in certain of the board slots.

Address pins are provided for each board slot, and are set to selected values for each board slot. Some of the address pins in each slot are set to a 0 or 1 binary value by connecting those pins to ground or leaving the pins to float to the pull-up voltage on the board. Others of the address pins in each slot are set to values that depend on which primary backplane slot the secondary backplane is plugged into. More specifically, each of these address pins is coupled to a respective one of the bus lines so as to set that address pin to a value that is determined by the voltage on that bus line. The values of the address pins in the board slots are set so that the board addresses are contiguous from one secondary backplane to the next.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

As illustrated in FIG. 3, a set of identical secondary backplanes 202 may be plugged into primary backplane slots 201 in a primary backplane 203. Boards 302 may then be plugged into board slots 301 in the secondary backplanes 202. In order for the board communications program 106 of the host computer or other devices to communicate with the various boards 302, the address of each board 302—that is, the location of the board slot 301 into which the board 302 is plugged—must be known. Furthermore, it is desirable for the boards to have contiguous binary addresses. The system and method of the present invention allow these contiguous addresses to be automatically configured when a secondary backplane is plugged into any primary backplane slot.

Contiguous addresses for the boards are provided by identifying a first set of address bits that do not vary for a particular secondary board slot in a secondary backplane, regardless of the primary backplane slot used, and a second set of address bits that do vary. Also identified is the way that the value of each address bit in the second set varies in accordance with the primary backplane slot used.

Figure 5:
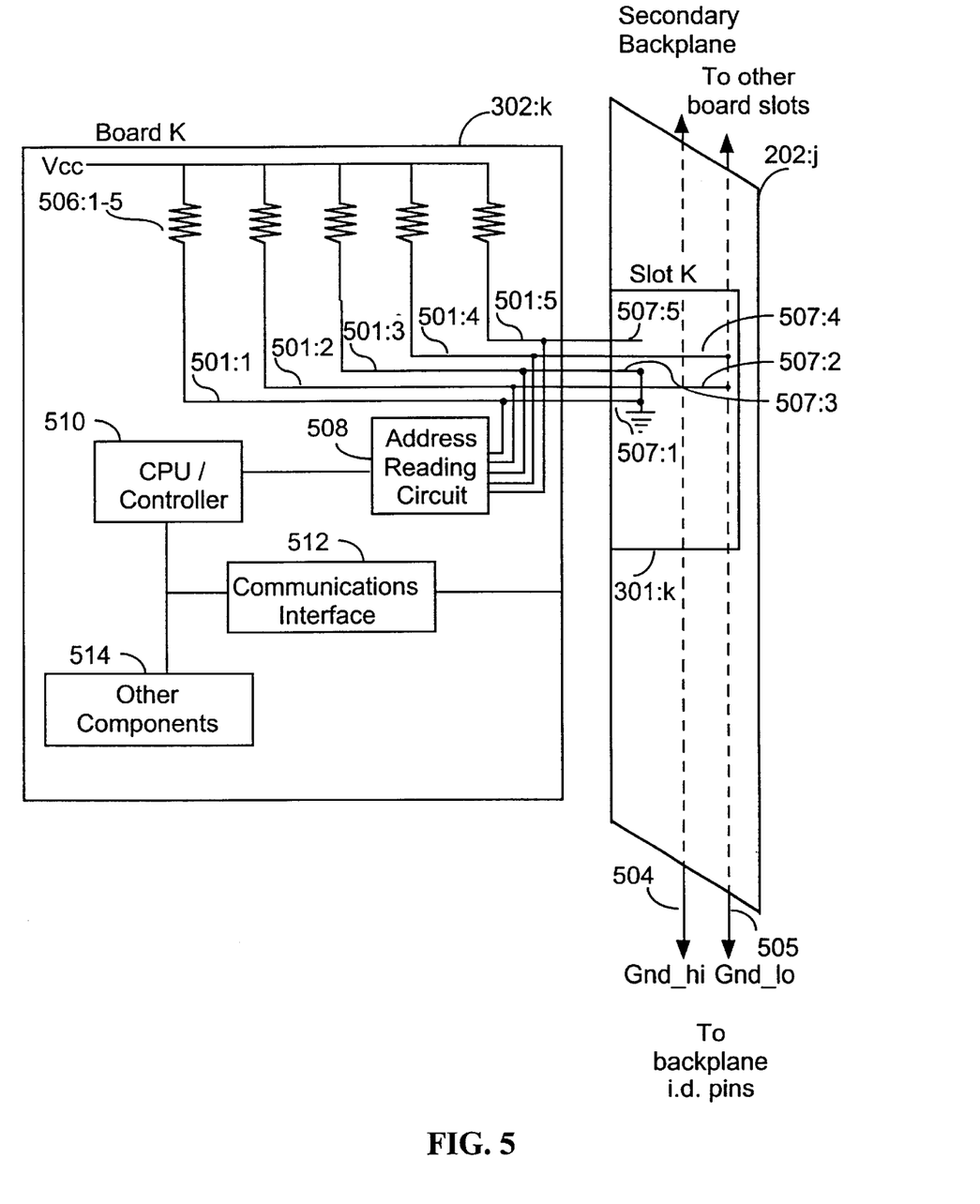
FIG. 5 illustrates details of the board and backplane slot configuration shown in FIG. 4.

Each address bit's voltage is set using appropriate circuitry in the board slot and address reading circuitry on the boards 302. As shown in FIG. 5, every board address pin 501 is coupled to a pull-up resistor 506. If the corresponding board slot address pin 507 is not connected to circuit ground, the pull-up resistor 506 pulls the corresponding address bit to a "high" reference voltage, such as the system supply voltage Vcc. Unconnected board slot address pins are said to be "floating." If the board slot address pin is connected to circuit ground, then the corresponding pull-up resistor 506 on the board has little or no impact on the voltage of the board address pin 501, which will remain at or very close to the ground voltage.

Figure 4:
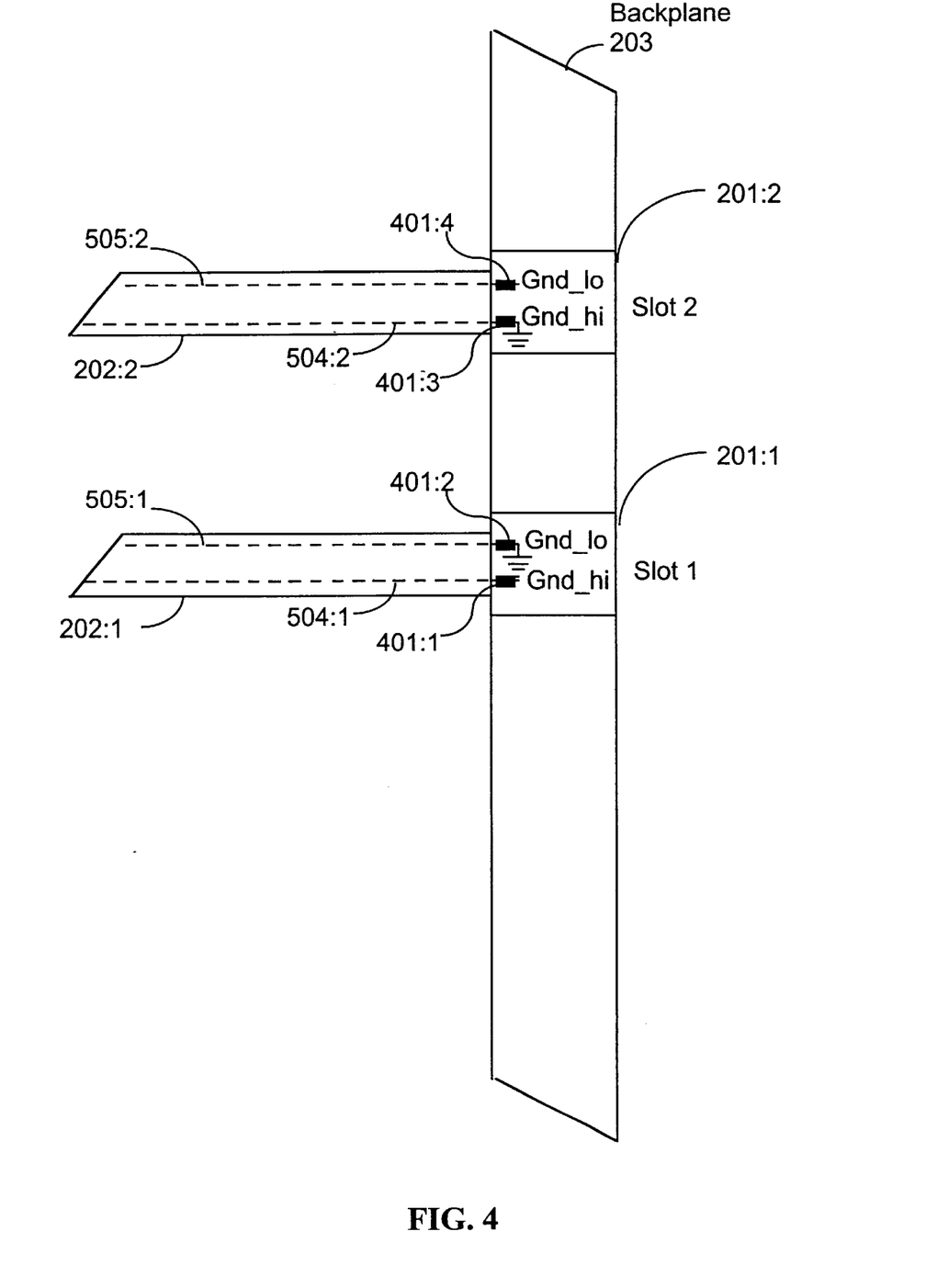
FIG. 4 illustrates the backplane slot configuration for one embodiment of the invention.

FIGS. 4 and 5 illustrate an example with two primary backplane slots 201 and two buses 504 and 505 in each secondary backplane. All the secondary backplanes are identical to each other, and therefore the differences in the board addresses of the boards inserted in the different secondary backplanes are due to different address bit signals on the buses 504 and 505. As shown in FIG. 5, an address bit 501:5 that is always equal to "1" in board slot 1 of a secondary backplane, regardless of the primary backplane slot, is set to "1" by leaving the slot address pin 507:5 unconnected or "floating." As a result, the board address pin 501:5 will be pulled up to the supply voltage Vcc on the board.

Address bits 3 and 1, which are always equal to "0" in board slot 1 of the secondary backplane regardless of the primary backplane slot, are set to "0" by connecting the slot address pins 507:3 and 507:1 to circuit ground. As a result, the board address pins 501:3 and 501:1 will be held at the circuit ground voltage.

The remaining address bits vary, depending on the primary backplane slot 201 into which the secondary backplane 202 is plugged. These remaining address bits are set by voltages on a pair of bus lines 504, 505. A separate pair of these bus lines 504, 505 is provided on each secondary backplane 202, and each secondary backplane's bus lines are connected to the board slots of that secondary backplane. As shown in FIG. 4, the voltages applied to these bus lines 504, 505 in each primary backplane slot 201 are different. That is, bus line 505 is grounded in a first one of the primary backplane slots 201:1 and allowed to float in the second one of the primary backplane slots 201:2, while the other bus line 504 is grounded in a second one of the primary backplane slots 201:2 and is allowed to float in the first one of the primary backplane slots 201:1.

The voltage levels on bus lines 504 and 505 are set by coupling them to primary address pins 401 in each primary backplane slot 201. In this example, in any given primary backplane slot only one primary address pin 401 is grounded, and the grounded primary address pin identifies or corresponds to the primary backplane slot. The other primary address pin in each primary backplane slot is left unconnected (floating). For example, the primary address pin 401 for the "ground low" bus 505 is grounded only in the first primary backplane slot 201:1, and is allowed to float in the second primary backplane slot 201:2.

In order to have contiguous addresses from one secondary backplane to the next, certain slot address pins, corresponding to address bits which vary, are coupled to either bus 505 or 504, depending on whether the address pin is to be set to 0 or 1 when in the first one of the primary backplane slots. More specifically, each board slot address pin (i.e., in a slot of a secondary backplane) whose value is equal to 0 when the secondary backplane is in slot 201:1 and is equal to 1 when the secondary backplane is in slot 201:2 is coupled to bus 505. Conversely, each board slot address pin whose value is equal to 1 when the secondary backplane is in slot 201:1 and is equal to 0 when the secondary backplane is in slot 201:2 is coupled to bus 504.

Systems having more than two primary backplane slots 201 may require as many as j! (j factorial) primary address pins in each primary backplane slot, where j is the number of primary backplane slots, in order to provide all the address voltages needed for address bits whose values vary from one primary backplane slot to another.

In some embodiments, instead of leaving slot address pins whose value is equal to "1" unconnected, those slot address pins are connected to a reference voltage, such as the system supply voltage.

Example: Two Secondary Backplanes, Ten Slots Each

In the exemplary system shown in FIGS. 4 and 5 there are two primary backplane slots (also called primary board slots) with two secondary backplanes, and each secondary backplane includes ten board slots, for a total of twenty boards. The following table gives the binary addresses for the boards inserted in the board slots, and identifies those bits which are the same, regardless of the primary backplane slot:

TABLE 1

| First Primary Board Slot | Second Primary Board Slot | Non-Varying Address Bits |
|---|---|---|
| 00001 | 01011 | 0X0X1 |
| 00010 | 01100 | 0XXY0 |
| 00011 | 01101 | 0XXY1 |
| 00100 | 01110 | 0X1X0 |
| 00101 | 01111 | 0X1X1 |
| 00110 | 10000 | X0YY0 |
| 00111 | 10001 | X0YY1 |
| 01000 | 10010 | XY0X0 |

TABLE 1-continued

| First Primary Board Slot | Second Primary Board Slot | Non-Varying Address Bits |
|---|---|---|
| 01001 | 10011 | XY0X1 |
| 01010 | 10100 | XYXY0 |
| X = 0, Y = 1 | X = 1, Y = 0 | |

In the third column of Table 1:

the 0's indicate address bits that are equal to "0" regardless of the primary backplane slot into which the secondary board is plugged, the 1's indicate address bits that are equal to "1" regardless of the primary backplane slot into which the secondary board is plugged, the X's indicate address bits equal to "0" and "1" when the secondary board is plugged into the first and second slots, respectively; and the Y's indicate address bits equal to "1" and "0" when the secondary board is plugged into the first and second slots, respectively.

The boards inserted in the board slots in the secondary backplane in the first primary backplane slot will have binary addresses 1–10. The boards inserted in the board slots in the secondary backplane in the second primary backplane slot will have binary addresses 11–20. To accomplish this, the address bits labeled with X's in Table 1 are coupled to bus 505, and the address bits labeled with Y's in Table 1 are coupled to bus 504. Further, as discussed above, the bits identified as non-varying will be set by being tied to ground, or allowed to float, at the board slot 301, without regard to the primary backplane slot 201 into which the secondary backplane 202 may be inserted.

For example, the first board slot 301:1 in each of the secondary backplanes will receive either the board with binary address 00001, corresponding to 1, or with binary address 01011, corresponding to 11, depending on whether the secondary backplane is inserted into the first or second of the two primary backplane slots.

The least significant bit 501:1 is identified as the "first" bit, and the most significant bit 501:5 is identified as the "fifth" bit. Thus, as shown in Table 1 above, for the first board slot, the first bit 501:1 will be "1," the third bit 501:3 will be "0" and the fifth bit 501:5 will be "0," regardless of which primary backplane slot is used. These bits will therefore be set in the board slot 301, as shown in FIG. 5—the third and fifth bits 501:3 and 501:5 connect to the third and fifth address pins 507:3 and 507:5 in the board slot 301, which are grounded, and the first bit 501:1 connects to the first address pin 507:1 which is allowed to float.

Turning to the varying bits, when the secondary backplane is inserted in the first primary backplane slot, the second 501:2 and fourth bits 501:4 must be grounded, but when the secondary backplane 302 is inserted in the second primary backplane slot 301, the second and fourth bits must be allowed to float. Therefore, the second and fourth bits 501:2 and 501:4 are tied to a bus line 505, referred to as the "ground low" bus line, via the second and fourth address pins 507:2 and 507:4 in the primary backplane slot 301.

When the secondary backplane 202 is inserted into a primary backplane slot 201, the bus line 505 is connected to a primary address pin 401 in the primary backplane slot. In the first primary backplane slot, this primary address pin 401:2 is grounded, and in the second primary backplane slot the primary address pin 401:4 is allowed to float. Therefore, when the secondary backplane is inserted in the first primary backplane slot, the bus line 505 is grounded, and the second and fourth bits of the slot address for slot 1 are grounded. When the secondary backplane is inserted in the second primary backplane slot, the bus line 505 will float, and therefore the second and fourth bits of slot 1 are pulled up to the supply voltage Vcc. Note that in the first primary backplane slot, the primary address pin for the other bus line 504, the ground high bus line, will be allowed to float, but in the second primary backplane slot the ground high bus line 504 will be grounded.

Thus, whichever primary backplane slot contains the secondary backplane, the address for the first slot will be automatically set to the correct value. By correctly setting the non-varying address pins at each primary backplane slot to a non-varying voltage, and by connecting the other, varying address pins to the appropriate bus lines, the address for each board slot can be configured to be a contiguous binary address, regardless of the order in which the secondary backplanes are inserted into the primary backplane slots in the primary backplane.

Still referring to FIG. 5, an address reading circuit 508 reads the board address by reading the voltages on the address bits 501 and converting those voltages into a binary address value. The resulting board address is conveyed to a central processing unit or other controller 510 on the board. If the board is a slave device, the CPU/controller 510 will communicate its identity and board address to the host computer for the system, via a communications interface 512, at predefined times such as when the system is powered on or restarted. Thereafter the host and slave device communicate using the board address to identify the device sending or receiving those messages. The board 302 may also include other components 514 that interact with the CPU/controller 510, some of which may make use of the board address or information corresponding to the board address. For instance, the board address of a power supply board may be used to determine if the board is a master or slave with respect to other power supply boards in the system.

All of the boards used in the system preferably have identical address reading circuits 508 and identical pull up resistors 506. As a result, each circuit board 302 can be used in any board slot of the system, unless some other constraint applies. For instance, in some systems, certain circuit boards must be next to each other, or in particular slots, because of special connections between neighboring circuit boards, or because of the presence of special connections in the secondary backplanes in certain slots.

Example: Three Secondary Backplanes, Twelve Slots Each

Another example of the present invention is a system in which the primary backplane has three slots, and each of the three secondary backplanes has twelve board slots. The contiguous binary addresses for the thirty-six board slots are identified in the table below.

TABLE 2

| First Primary Board Slot | Second Primary Board Slot | Third Primary Board Slot | Non-Varying Address Bits |
|---|---|---|---|
| 000001 | 001101 | 011001 | 0zXy01 |
| 000010 | 001110 | 011010 | 0zXy10 |
| 000011 | 001111 | 011011 | 0zyy11 |
| 000100 | 010000 | 011100 | 0XzY00 |
| 000101 | 010001 | 011101 | 0XzY01 |
| 000110 | 010010 | 011110 | 0XzY10 |
| 000111 | 010011 | 011111 | 0XzY11 |

TABLE 2-continued

| First Primary Board Slot | Second Primary Board Slot | Third Primary Board Slot | Non-Varying Address Bits |
| --- | --- | --- | --- |
| 001000 | 010100 | 100000 | zyxy00 |
| 001001 | 010101 | 100001 | zyxy01 |
| 001010 | 010110 | 100010 | zyxy10 |
| 001011 | 010111 | 100011 | zyxy11 |
| 001100 | 011000 | 100100 | zyZY00 |
| X = 0, x = 1 | X = 1, x = 0 | X = 1, x = 0 | |
| Y = 1, y = 0 | Y = 0, y = 1 | Y = 1, y = 0 | |
| Z = 1, z = 0 | Z = 1, z = 0 | Z = 0, z = 1 | |

Figure 6:
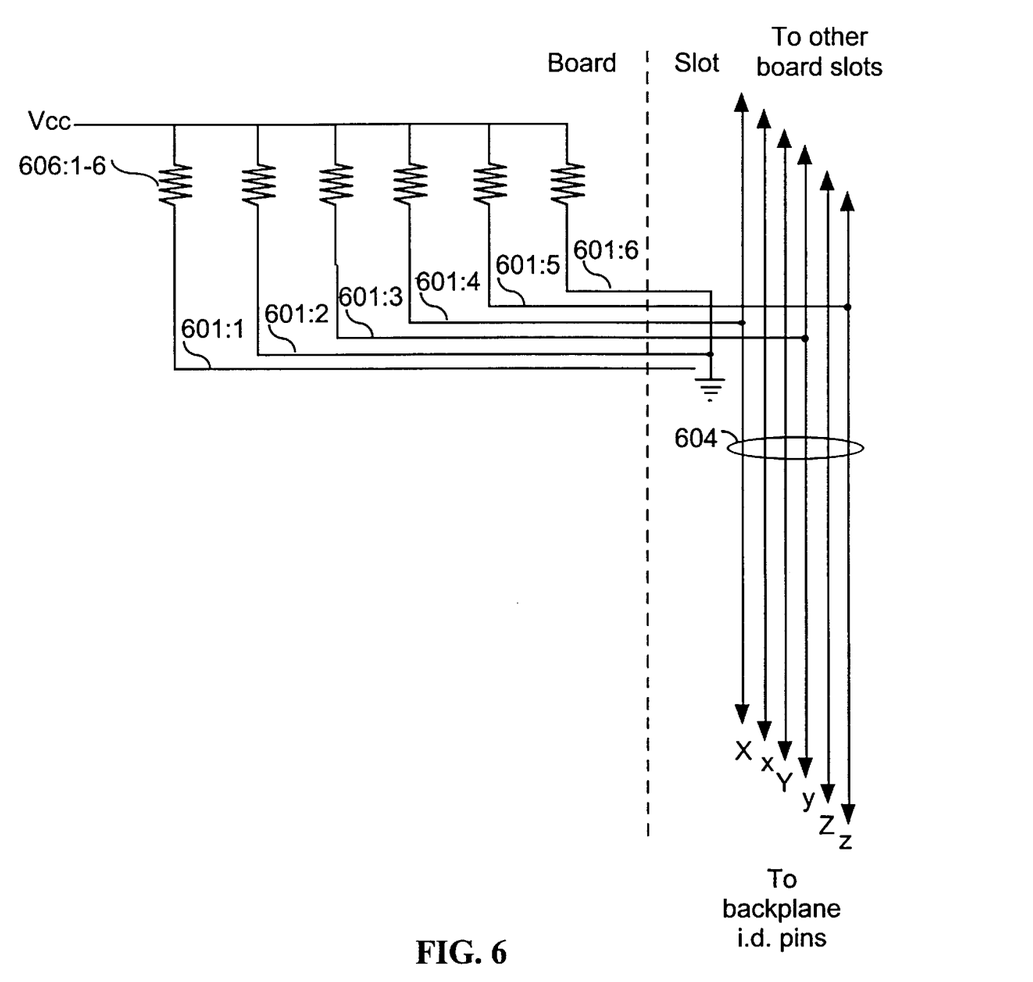
FIG. 6 illustrates an alternate embodiment of the invention.

The circuitry for the first board slot for this example is shown in FIG. 6. In this example, six primary address pins, labeled X, x, Y, y, Z and z are used to set to address bits on boards inserted into the secondary board slots. The X, Y and Z address bits are grounded in the first second and third primary backplane slots, respectively, and are allowed to float (or are connected to Vcc) in the other slots. The x, y and z address bits are allowed to float (or are connected to Vcc) in the first, second and third primary backplane slots, respectively, and are connected to circuit ground in the other slots. When each secondary backplane has twelve board slots, these six signals are connected to the address pins of the board slots in accordance with the pattern shown in Table 2. When the number of board slots in the secondary backplane is some other number, the connection pattern will be as follows:

0 for address pins that are to be grounded regardless of the primary backplane slot in which the secondary backplane is inserted;

1 for address pins that are to float or be connected to Vcc regardless of the primary which the secondary backplane is inserted;

X for address pins grounded when the secondary backplane is inserted in the first primary backplane slot, and otherwise float;

x for address pins that float when the secondary backplane is inserted in the first primary blackplane slot, and otherwise are grounded;

Y for address pins grounded when the secondary backplane is inserted in the second primary backplane slot, and otherwise float;

y for address pins that float when the secondary backplane is inserted in the second primary backplane slot, and otherwise are grounded;

Z for address pins grounded when the secondary backplane is inserted in the third primary backplane slot, and otherwise float; and z for address pins that float when the secondary backplane is inserted in the third primary backplane slot, and otherwise are grounded;

For the first board slot in each secondary backplane, the first bit 601:1 will always be "1," and the second bit 601:2 and sixth bit 601:6 will always be "0." Therefore in the first board slot the first bit 601:1 is allowed to float and the second and sixth bits are grounded. The remaining bits 601:3, 601:4 and 601:4 vary, depending on which primary backplane slot is used, and therefore will be set using three of the six bus lines 604, as specified in Table 2. In particular, the third bit 601:3 is connected to the y bus so that it will be grounded when the secondary backplane is in the first and third primary backplane slots and will float when in the second primary backplane slot. The fourth bit 601:4 is connected to the X bus so that it will be grounded when the secondary backplane is in the first primary backplane slot and will float when in the second and third primary backplane slots. The fifth bit 601:5 is connected to the z bus so that it will be grounded when the secondary backplane is in the first and second primary backplane slots and will float when in the third primary backplane slot.

The resulting binary addresses for the first slot in a secondary backplane are: 000001 when the secondary backplane is inserted in the first primary backplane slot; 001101 when the secondary backplane is inserted in the second primary backplane slot; and 011001 when the secondary backplane is inserted in the third primary backplane slot. The addresses for the remaining primary backplane slots are similarly configured automatically, regardless of the order of the secondary backplanes in the primary backplane slots, by correctly setting the non-varying address bits and connecting the varying address bits to the appropriate bus lines 604 at each board slot.

Alternate Embodiments

The present invention can be used in systems with any number of secondary backplanes greater than one, and with any number of slots in the secondary backplanes. It should be noted there is less need for the present invention when the number of slots in each secondary backplane is an integer power of two (i.e., $2^N$), because in that case, only the most significant address bits will vary from one board to the next, and values of those most significant bits can be directly set by applying corresponding voltages to a set of primary backplane slot address pins. When the number of slots in each secondary backplane is not an integer power of two, the board address pins that are coupled to the variable address signal buses 604 (FIG. 6) are located among both the least significant bits (i.e., bits 1 through $k=\text{roundup}(\log_2 M)$, where M is the number of board slots in each secondary backplane) and the most significant bits of the board address.

While the present invention has been described with reference to a few specific embodiments, the description is illustrative of the invention and is not to be construed as limiting the invention. For example, it will be appreciated that the device and method could be used with different, non-binary numbers of board slots, and different numbers of secondary backplanes could be used. Various other modifications may occur to those skilled in the art without departing from the true spirit and scope of the invention as defined by the appended claims.

What is claimed is:

1. A device for permitting communication between boards with electronic circuitry, comprising:

a primary backplane with a plurality of primary backplane slots, each primary backplane slot including one or more primary address pins;

a plurality of secondary backplanes, each inserted into a respective one of the primary backplane slots, and each including a plurality of board slots and one or more bus lines, each bus line for coupling a respective one of the primary address pins to a subset of the board slots, wherein each board slot includes a plurality of slot address pins for assigning a unique slot address to the board slot, each slot address pin is set to an address bit value by a corresponding circuit connection, and the circuit connection for at least one address pin in each board slot is a connection to a respective one of the bus lines; and a plurality of boards, each board being inserted into a board slot and including circuitry to read the slot address of the board slot from the slot address pins;

wherein each of the secondary backplanes has a number of board slots that is not an integer power of two, and the unique slot addresses of the board slots in the plurality of secondary backplanes together form a contiguous set of board addresses.

2. The device of claim 1, wherein the circuit connection for a slot address pin that is set to an address bit value of 0 is a connection to a circuit ground node, and the circuit connection for an slot address pin that is set to an address bit value of 1 is an open circuit that leaves the slot address pin floating.

3. The device of claim 2, wherein the board circuitry for reading the slot address includes a plurality of board address pins, each coupled to a corresponding one of the slot address pins in the board slot, and a pull up resistor coupled to each of the board address pins.

4. The device of claim 2, wherein the circuit connection for a particular slot address pin is the connection to a respective one of the bus lines when the particular slot address pin is set to an address bit value of 0 when the secondary backplane in which the slot address pin is located is inserted in a first one of the primary backplane slots and is set to an address bit value of 1 when the secondary backplane in which the slot address pin is located is inserted in a second one of the primary backplane slots.

5. The device of claim 1, wherein the primary address pins in each primary backplane slot are coupled so as to define a distinct address bit value pattern for each primary backplane slot and for each secondary backplane inserted into the primary backplane slots.

6. A method of providing contiguous binary addresses for boards which are plugged into board slots in secondary backplanes, which are in turn plugged into primary backplane slots of a primary backplane, comprising:

providing a plurality of primary address pins in each primary backplane slot, and coupling the primary address pins in each primary backplane slot so as to define a distinct address bit value pattern for each primary backplane slot;

providing a set of identical secondary backplanes, each secondary backplane including a plurality of board slots and one or more bus lines, each bus line coupling a respective one of the primary address pins to a subset of the board slots, wherein each board slot includes a plurality of slot address pins for assigning a unique slot address to the board slot, each slot address pin is set to an address bit value by a corresponding circuit connection, and the circuit connection for at least one address pin in each board slot is a connection to a respective one of the bus lines; and inserting a plurality of boards into board slots of the secondary backplanes;

using circuitry on each of the inserted boards, reading the slot address of the board slot from the slot address pins;

wherein the number of board slots in each of the secondary backplanes is not an integer power of two, and the unique slot addresses of the board slots in the plurality of secondary backplanes together form a contiguous set of board addresses.

7. The method of claim 6, wherein:

the first providing step includes grounding a first subset of the primary address pins in a first one of the primary backplane slots and grounding a distinct subset of the primary address pins in a second one of the primary backplane slots.

8. The method of claim 7, wherein:

the first providing step includes leaving a second subset of the primary address pins in a first one of the primary backplane slots unconnected and leaving unconnected a second distinct subset of the primary address pins in a second one of the primary backplane slots.

* * * * *